US012358465B2

(12) United States Patent
Carlsson et al.

(10) Patent No.: US 12,358,465 B2
(45) Date of Patent: Jul. 15, 2025

(54) KEYLESS KEY

(71) Applicant: Volvo Car Corporation, Gothenburg (SE)

(72) Inventors: Christoffer Carlsson, Gothenburg (SE); Alfons Massey, Trollhättan (SE)

(73) Assignee: Volvo Car Corporation, Gothenburg (SE)

( * ) Notice: Subject to any disclaimer, the term of this patent is extended or adjusted under 35 U.S.C. 154(b) by 179 days.

(21) Appl. No.: 18/152,361

(22) Filed: Jan. 10, 2023

(65) Prior Publication Data

US 2024/0227728 A1 Jul. 11, 2024

(51) Int. Cl.
*B60R 25/24* (2013.01)
*B60R 25/04* (2013.01)

(52) U.S. Cl.
CPC .............. *B60R 25/24* (2013.01); *B60R 25/04* (2013.01); *B60R 2025/0405* (2013.01); *B60R 2325/101* (2013.01); *B60R 2325/202* (2013.01); *B60R 2325/205* (2013.01)

(58) Field of Classification Search
CPC .. B60R 25/24; B60R 25/04; B60R 2025/0405
See application file for complete search history.

(56) References Cited

U.S. PATENT DOCUMENTS

| 8,943,187 B1 | 1/2015 | Saylor |
| 10,202,100 B1 | 2/2019 | Tucker et al. |
| 2013/0099892 A1* | 4/2013 | Tucker ................... H04L 9/08 340/5.61 |
| 2015/0262441 A1 | 9/2015 | Km et al. |
| 2017/0116804 A1* | 4/2017 | Bae ......................... G07C 9/25 |
| 2017/0352214 A1 | 12/2017 | Maiwand et al. |
| 2020/0062216 A1* | 2/2020 | Fogelklou ........... H04W 12/069 |
| 2020/0099522 A1 | 3/2020 | Yang et al. |

(Continued)

FOREIGN PATENT DOCUMENTS

| DE | 102015103329 A1 | 9/2016 |
| DE | 102017113646 A1 | 12/2018 |
| WO | 2022162982 A1 | 8/2022 |

OTHER PUBLICATIONS

Wardlaw "What is a Digital Key for a Car?" J.D.Power [/] Nov. 16, 2020. 10 pages.

(Continued)

*Primary Examiner* — Nabil H Syed
(74) *Attorney, Agent, or Firm* — Amin, Turocy & Watson, LLP

(57) ABSTRACT

Various systems and methods are presented regarding incorporating "connected/smart" vehicle technology into a legacy system vehicle. A smart key can be communicatively coupled to a digital/electronic interface, wherein the key and the interface are co-located on a vehicle. One or more portable devices (e.g., one or more cellphones) can be configured to communicate with the interface and, accordingly, operate the vehicle in a manner similar to if the key was in the possession of an entity wanting to gain access/operate the vehicle. Prior to initiating operation of the vehicle, the respective portable devices can be synchronized/authenticated to enable the respective portable device to access and command operation of the interface and the co-located key.

20 Claims, 12 Drawing Sheets

(56) References Cited

U.S. PATENT DOCUMENTS

| | | | |
|---|---|---|---|
| 2021/0250355 A1* | 8/2021 | Galdo | G06F 21/335 |
| 2021/0331646 A1 | 10/2021 | Schubert et al. | |
| 2022/0231862 A1* | 7/2022 | Chen | H04W 12/0471 |
| 2023/0360834 A1* | 11/2023 | Yamamoto | E05B 19/00 |
| 2024/0198963 A1* | 6/2024 | Yamada | B60R 25/01 |

OTHER PUBLICATIONS

Extended European Search Report received for European Patent Application No. 24150716.9 dated Jun. 14, 2024, 8 pages.
Communication pursuant to Rule 69 EPC received for European Patent Application No. 24150716.9 dated Jul. 22, 2024, 2 pages.

\* cited by examiner

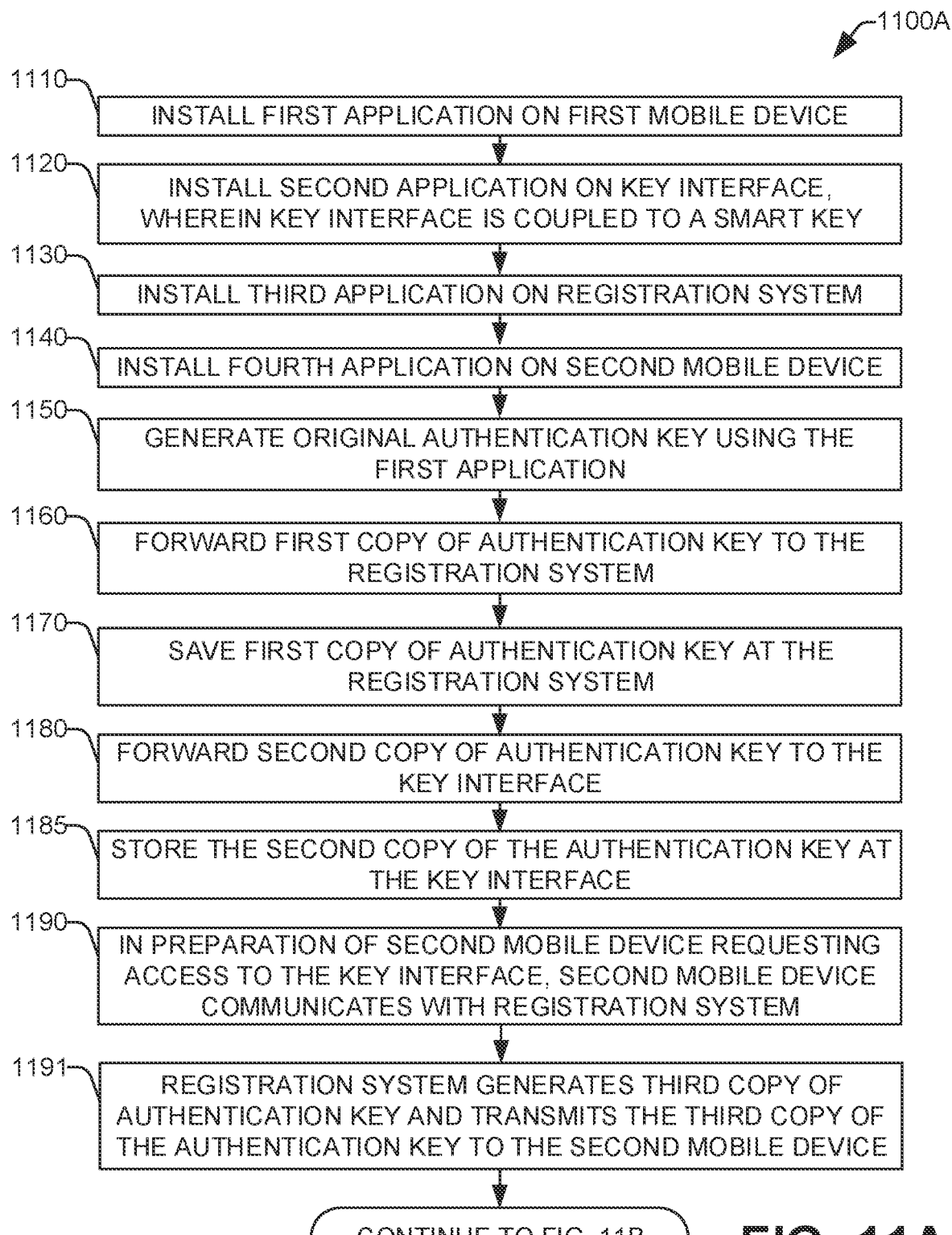

KEYLESS KEY

TECHNICAL FIELD

This application relates to techniques facilitating access and operation of a vehicle without having access to a physical key configured to operate the vehicle.

BACKGROUND

A plethora of applications designed to assist with day-to-day activities are available on portable devices, such as cellphones. Such applications can enable a person to access a vehicle without having the physical key for that vehicle available. Further, vehicles can now be accessed without a key, e.g., via a touch sensor, code entry via a keypad, a fingerprint sensor, and the like.

However, there are still many vehicles in use that do not have such built-in, "smart" access technologies available. Many vehicles utilize what might be considered legacy technology, e.g., requiring a physical key to access the vehicle, such as a smart key. The key can include various buttons configured to respectively perform various functions such as lock/unlock a door(s), lock/unlock the trunk, start/stop engine, and the like. However, such legacy systems limit access and operation of a vehicle to only those who have a physical key in their possession.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, devices, computer-implemented methods, methods, apparatus and/or computer program products are presented that facilitate accessing and/or operating a vehicle without having to have access to a physical key configured for the vehicle.

According to one or more embodiments, a system is provided that can comprise a smart key configured to interact with a vehicle, the smart key comprising a button, wherein, when selected, the button is configured to initiate an operation on the vehicle and a key interface coupled to the smart key. In an embodiment, the key interface can be configured to receive an instruction. In a further embodiment, in response to receiving the instruction, the key interface can be configured to duplicate operation of the button, to cause initiation of the vehicle operation. In a further embodiment, the key interface can further comprise a transceiver configured to receive a signal, wherein the signal includes the instruction. In an embodiment, the instruction can be received from a device remotely located from the key interface, wherein the remotely located device can be one of a smartphone, a mobile phone, a cellphone, a personal digital assistant (PDA), a handheld computing device, a smartwatch, a tablet computer, or a laptop computer.

In a further embodiment, the signal can be a short-range wireless signal. In another embodiment, the key interface can further comprise an access component configured to receive a first digital signature, wherein the first digital signature can be a unique identification configured for the vehicle. In a further embodiment, access component can be further configured to receive a second digital signature and compare the first digital signature with the second digital signature. In the event of the first digital signature matches the second digital signature, the access component can be configured to grant access to a remotely located device to control operation of the button.

In another embodiment, the key interface can further comprise an access component configured to receive a digital identifier, wherein the digital identifier is a unique identification configured for the vehicle. In another embodiment, the access component can be further configured to receive a digital certificate comprised of the unique identifier configured for the vehicle and a digital signature which is linked to the vehicle's unique identifier, and verify the digital signature. In an embodiment, in response to the digital signature being verified, the access component can be configured to grant access to a remotely located device to control operation of the button. In another embodiment, in response to the digital signature not being verified, the access component is configured to refuse access by the remotely located device to control operation of the button.

In another embodiment, the smart key can further comprise a first printed circuit board (PCB) and the key interface comprises a second PCB, a first connection on the first PCB is hardwired to a second connection on the second PCB to connect the button on smart key to the key interface. In another embodiment, the smart key can further comprise a first PCB and the key interface comprises a second PCB, a first connection on the first PCB is electrically connected to a second connection on the second PCB by a spring-loaded connecting pin to connect the button on the smart key to the key interface.

In a further embodiment, the smart key can comprise a smart card with an incorporated radio frequency identification device (RFID) and the key interface further comprises a Faraday Cage component configured to prevent access to the RFID until an authentication process has been successfully performed.

In other embodiments, elements described in connection with the disclosed systems can be embodied in different forms such as a computer-implemented methods, computer program products, or other forms. For example, in an embodiment, a computer program product can comprise a memory (a computer readable medium) configured to store computer executable components and, further, a processor configured to execute the computer executable components stored in the memory, wherein the computer executable components can comprise an access component located on a key interface co-located with a smart key, wherein the key-interface is located on a vehicle, the access component can be configured to receive, from a remotely located device, an access request comprising a digital certificate which includes a digital signature that is linked to a unique identifier configured for the vehicle. The key-interface can be further configured to verify the access request and in response to the digital signature being verified, granting control of the smart key by the remotely located device. In an embodiment, the first digital signature can be generated by a first device configured to operate the smart key, the smart key controls at least one operation of the vehicle. In an embodiment, the operation is one of unlock a door of the vehicle, unlock a trunk of the vehicle, or start an engine configured to propel the vehicle. The remotely located device can be one of a smartphone, a mobile phone, a cellphone, a personal digital assistant (PDA), a handheld computing device, a smartwatch, a tablet computer, or a laptop computer. Further, the smart key can hardwired to the key interface.

In a further embodiment, the smart key can further comprise a printed circuit board (PCB), and the access component can be further configured to receive a command signal from the remote device, wherein the command signal pertains to a first operation of the smart key and activating a connection on the PCB configured for the first operation of the smart key.

Another embodiment can comprises a computer-implemented method for controlling operation of a vehicle, wherein the computer-implemented method can comprise receiving, from a remotely located device, an access request comprising a first digital signature, wherein the access request is received at a key interface electrically coupled to a smart key configured to initiate an operation on the vehicle, comparing the access request with a second digital signature stored at the key interface, and in response to the first digital signature matching the second digital signature, enabling operation of the smart key by the remotely located device. In an embodiment, the remotely located device is one of a smartphone, a mobile phone, a cellphone, a personal digital assistant (PDA), a handheld computing device, a smartwatch, a tablet computer, or a laptop computer.

In an embodiment, the operation can be one of unlock a door of the vehicle, lock a door of the vehicle, unlock a trunk of the vehicle, lock a trunk of the vehicle, open a trunk of the vehicle, close a trunk of the vehicle, start an engine configured to propel the vehicle, stop the engine, activating a key battery, deactivating a key battery, or any other operation provided on a smart key.

An advantage of the one or more systems, computer-implemented methods and/or computer program products can be enabling access and/or operation of a vehicle by a person not having the physical key in their possession. Access can be granted to a person, whereby, after being authorized to access the vehicle, the person can utilize an application on a portable device (e.g., a cellphone) to access and/or operate the vehicle. Per the various embodiments presented herein, operation of the vehicle is extended to those authorized to operate the vehicle, e.g., other family members, drivers operating fleet vehicles, rental car drivers, and the like. Further, the requirement to locate the key for operation is no longer required, a person simply needs a cellphone with the vehicle access application operating thereon. The various embodiments presented herein convert a vehicle having a legacy system comprising a physical key to be a "connected/smart" vehicle.

DESCRIPTION OF THE DRAWINGS

One or more embodiments are described below in the Detailed Description section with reference to the following drawings.

FIGS. 11A and 11B, flow diagrams 1100A and 1100B, present an example scenario of operation of a smart key by a remote device, in accordance with various aspects and implementations of the subject disclosure.

DETAILED DESCRIPTION

Figure 1:
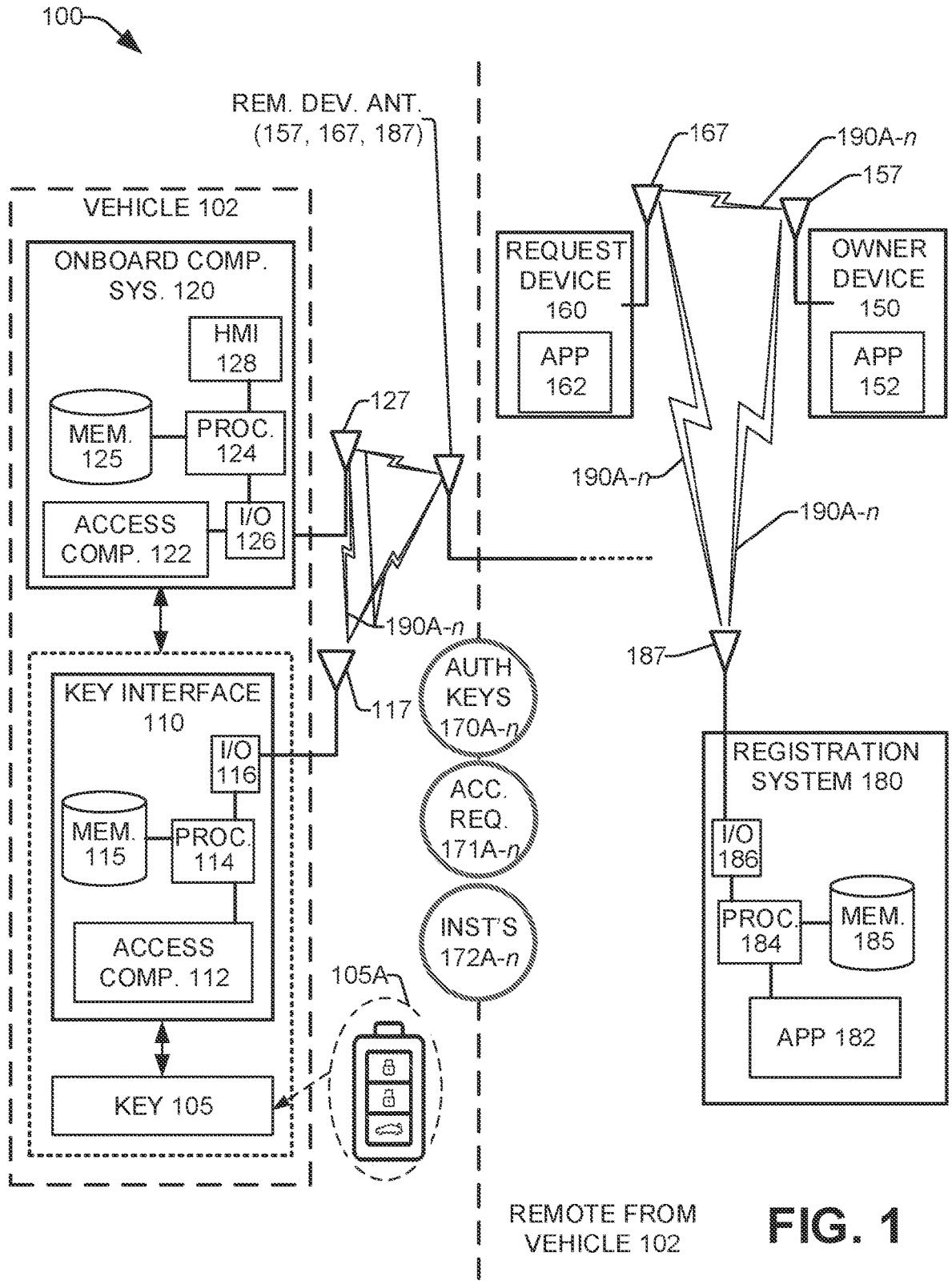
FIG. 1 is a block diagram representation 100 of example components related to authorizing and enabling access of a vehicle without an operator having to have the physical key configured to access the vehicle available (e.g., in their possession), in accordance with various aspects and implementations of the subject disclosure.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, "data" can comprise metadata. Further, ranges A-n are utilized herein to indicate a respective plurality of devices, components, signals etc., where n is any positive integer.

In the various embodiments presented herein, the disclosed subject matter can be directed to extending a vehicle with a legacy access system (e.g., requiring a physical key to gain access) to function and/or have functionality available akin to technology available on a "connected/smart" vehicle. As use and development of mobile/portable technology (e.g., cellphones) has become ubiquitous, vehicles are now available where many operational features of a vehicle can be controlled via a mobile device. However, the legacy systems utilizing a physical key (e.g., a smart key) do not have the benefit of operation using such mobile technology. The various embodiments presented herein are directed to incorporating a physical key into a digital interface, wherein the digital interface enables the physical key and/or features of the physical key to be operated by mobile technology. The digital interface enables control of one or more vehicle operations (e.g., unlock, lock, operate) as well as interaction with the vehicle via data presented on a HMI (e.g., a screen on the vehicle dashboard), such as visualization(s) regarding vehicle status, location maps, etc. A first user of the vehicle (e.g., owner of the vehicle) can authorize a second user (e.g., a designated user) with access to/operation of the vehicle, wherein the second user does not have the vehicle key in their possession and are interacting with the vehicle via a software application operating on their cellphone (for example). In a further embodiment, a designated user can be provided with all of the operations available on a smart key and all of the operations/interactions available via a HMI. In an alternative scenario, the owner of the vehicle can limit options available to a designated user, e.g., access to the vehicle trunk is not available on the software application, one or more screens on the HMI are not available for interaction, and the like. The various embodiments enable a legacy vehicle to function as a smart vehicle enabling easier access of the vehicle by more than one user, the vehicle can easily be borrowed without the physical key being handed over, and such activities as vehicle sharing, fleet management, vehicle rental, and the like are simplified compared to having to ensure the driver has the physical key in their possession.

It is to be appreciated that while the various embodiments presented herein are directed towards incorporating technology into a vehicle, such as an automobile, the various embodiments are not so limited. Accordingly, the various technology can be applied to any systems that utilize a smart key, wherein the key can be incorporated into a digital interface enabling the system to be a smart system. Hence, the various embodiments herein can be applied to any situation comprising a lock interacting/interfacing with a key.

Turning now to the drawings, FIG. 1 illustrates a system 100 that can be utilized to authorize and enable access of a vehicle without an operator having to have the physical key configured to access the vehicle available (e.g., in their possession), according to at least one embodiment.

System 100 comprises a vehicle 102 with various devices and components located thereon, such as a physical key 105, a key interface 110, and an onboard computer 120, as further described. System 100 can further comprise various mobile devices 150 (aka, owner device) and 160 (aka requesting device), which can have various software applications 152, 162, etc., respectively operating thereon. System 100 can, in a further embodiment, comprise a registration system 180 configured to control/authenticate access of the vehicle 102 and key interface 110. In one or more embodiments, the mobile devices 150 and 160, and the registration system 180 and can be remotely located to the vehicle 102. The mobile devices 150 and 160 can be configured to exchange authentication keys 170A-n (e.g., digital signatures) using a peer-to-peer security protocol, wherein the authentication keys 170A-n can be configured to enable granting/permission for a user of requesting device 160 to access/operate the vehicle 102 owned by the user of owner device 150, as further described herein. In an embodiment, the authentication keys 170A-n can be shared between devices 150 and 160 via the registration system 180, as further described herein. The authentication keys 170A-n can be transmitted as part of one or more access requests 171A-n transmitted between the mobile devices 150/160 and the key interface 110. Further, once access has been granted to the key interface 110, further communications can be sent between the mobile devices 150/160 and the key interface 110, wherein the communications can include various instructions 172A-n (e.g., commands) to simulate operation of the key 105.

In an embodiment, the key 105 can be coupled to key interface 110. Key 105 is a physical device also known as a smart key, an intelligent key, and suchlike (e.g., where key 105A in FIG. 1 provides representation of key 105 as a smart key). The key 105 can include various buttons, microchips, sensors, transceivers, radio-frequency identification devices (RFIDs), and the like, to enable interaction of the key 105 with the vehicle 102 (e.g., unlock a door of the vehicle 102). Further, the key 105 can have a smartcard format with an embedded RFID. The key interface 110 can be located anywhere on the vehicle 102, e.g., positioned under vehicle 102's dashboard, under a seat, in a glove compartment, etc., with the key 105 coupled (electronically and/or physically) to the key interface 110. In an embodiment, the key interface 110 and key 105 can be located inside the vehicle 102 in a location such that if a person smashes a window to gain access of vehicle 102 (e.g., to steal contents from the passenger compartment of vehicle 102), the key interface 110 and key 105 cannot be reached by the thief. The key interface 110 can further comprise an access component 112, which can be configured to receive one or more signals/commands/instructions regarding access to operations performed by the key 105 and other operations performed by an onboard computing system (OCS) 120 regarding operation of the vehicle 102. In an embodiment, the access component 112 can comprise of a software application configured to interface with the software applications 152 and 162 respectively operating on mobile devices 150 and 160.

Turning momentarily to FIGS. 2-6, FIGS. 2-6 present respective views and configurations 200, 300, 400, 500, and 600, for co-locating the key 105 with the key interface 110, and, in an embodiment, electrically coupling the key 105 to the key interface 110, in accordance with one or more embodiments.

Figure 2:
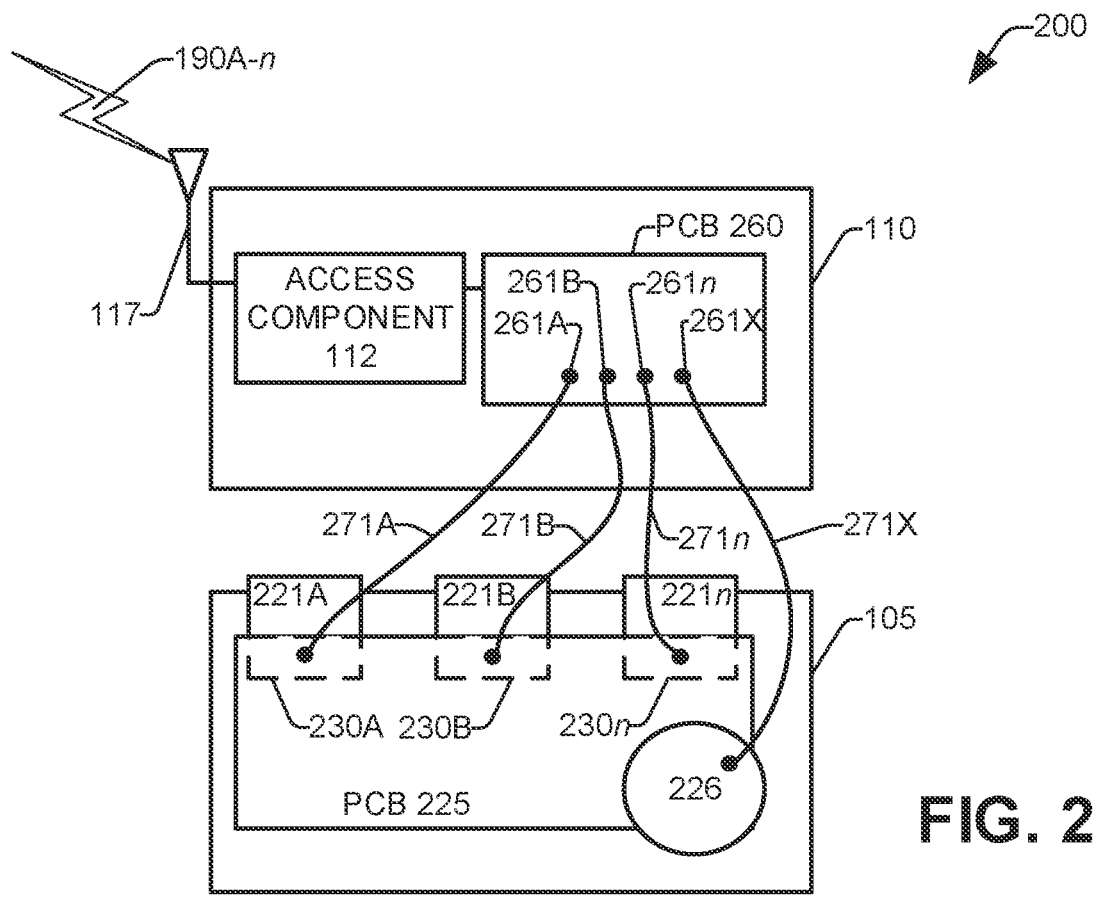
FIG. 2 is a block diagram representation 200 comprising a key located at a key interface component, in accordance with various aspects and implementations of the subject disclosure.

FIG. 2 presents a system 200 comprising a key 105 located at a key interface 110 component, in accordance with an embodiment. Key 105 can be a physical key configured with various buttons 221A-n, to enable one or more operations of the vehicle 102. For example, button 221A, when activated, can be configured to lock/unlock a door(s) of the vehicle 102; button 221B, when activated, can be configured to lock/unlock the vehicle 102 trunk/boot; button 221n, when activated, can be configured to start/stop the vehicle engine; as well as being configured for any other operation(s) that is enabled by one of more buttons provided on a physical key as available in the marketplace such as open/close a trunk/boot of a vehicle, start/stop an engine configured to propel the vehicle, activating/deactivating a key battery, or any other operation provided on a smart key.

In an embodiment, per FIG. 2, coupling of the key 105 with key interface 110 can entail removing a cover of the key 105 to expose the underlying printed circuit board (PCB) 225 with electrical circuits 230A-n for operating the buttons 221A-n available for electrical connection. The various electrical connections for the button circuits 230A-n on the PCB 225 of the key 105 can be hardwired to respective connections 261A-n on a PCB 260 in the key interface 110. As shown, connections 261A-n on PCB 260 can be respectively connected (e.g., soldered) to button circuits 230A-n of the respective buttons 221A-n on PCB 225. For example, button 221A and circuit 230A can be connected to connection 261A via wire 271A, wherein, for example, button 221A is configured to lock/unlock a door of vehicle 102; button 221B and connector 230B can be connected to connection 261B via wire 271B, wherein, for example, button 221B is configured to lock/unlock the trunk of vehicle 102; button 221n and connector 230n can be connected to connection 261n via wire 271n, wherein button 221n is configured to stop/start the engine of vehicle 102. Further, component 226 of PCB 225 can be a battery and circuit to power the key 105 when it is being used as a standalone smart key, however, the circuit 226 can be connected to PCB 260 and connector 261X with a wire 271X such that the PCB 260 is providing power to PCB 225. In an embodiment, any of the respective button circuits 230A-n or connections/circuits 261A-n can include a relay or relay-type circuit configured to open/close in response to an instruction (e.g., instructions 172A-n) generated by a mobile device (e.g., either of mobile devices 150 or 160).

Figure 3:
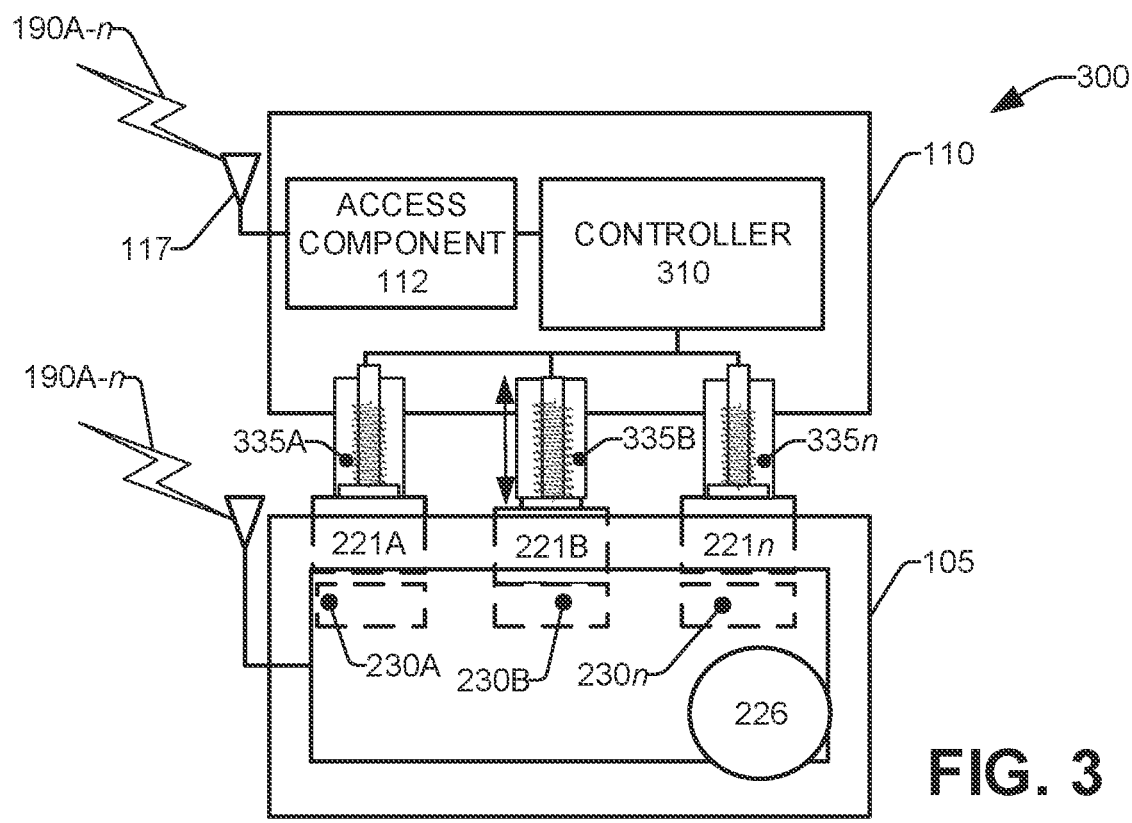
FIG. 3 is a block diagram representation 300 comprising a key located at a key interface, in accordance with various aspects and implementations of the subject disclosure.

Turning to FIG. 3, a system 300 is presented comprising the key 105 located at the key interface 110, in accordance with an embodiment. The key interface 110 can be designed to locate/hold the key 105, such that the key 105 can be readily removed if required, e.g., without having to break the physical connections of a key that is physically connected by hard wiring (per the embodiment presented in FIG. 2). For example, the key 105 can be clamped into placed at the key interface 110, alternatively, it can be located by a snap-fit or other locating means. The key interface 110 can be configured with physical motors/actuators 335A-n positioned to physically operate the one or more buttons 221A-n on the key 105, such that when a command (e.g., an instruction 172A-n) is received to operate a button 221A-n on the key 105, the respective physical actuator(s) 335A-n is activated (e.g., by controller 310 operating in conjunction with access component 112) and the respective button 221A-n is physically moved, with a corresponding control operation performed (e.g., unlocking of the door). As shown in FIG. 3, physical actuator 335B has been activated, causing button 221B to be pressed which closes the circuit of button circuit 230B; physical actuators 335A and 335n are currently not activated, with buttons 221A and 221n not being selected/pressed.

Figure 4:
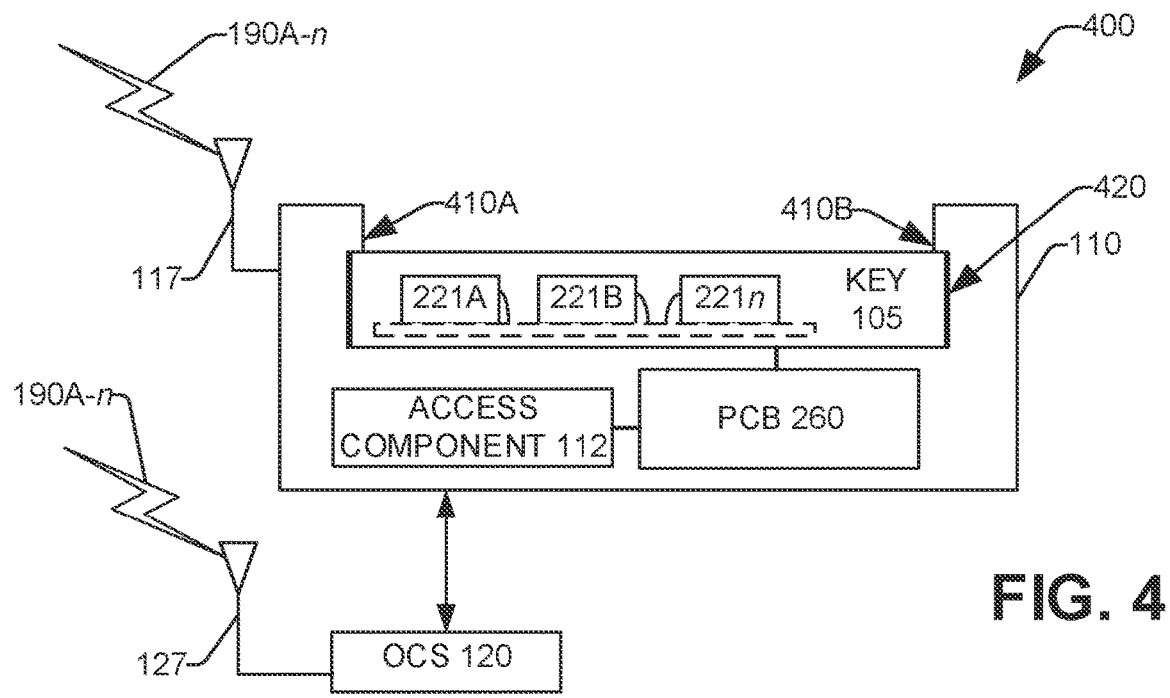
FIG. 4 is a block diagram representation 400 comprising a key co-located with a key interface, in accordance with various aspects and implementations of the subject disclosure.

As shown in FIG. 4, and as previously described, in an embodiment, the key 105 can be co-located with the key interface 110. In an embodiment, the key 105 can be placed at the key interface 110 and removed as needed. The key 105 can be placed in a recess 420 formed in the key interface 110 and held in place by a snap-fit configuration such as clips/protruding portions 410A-B.

Figure 5:
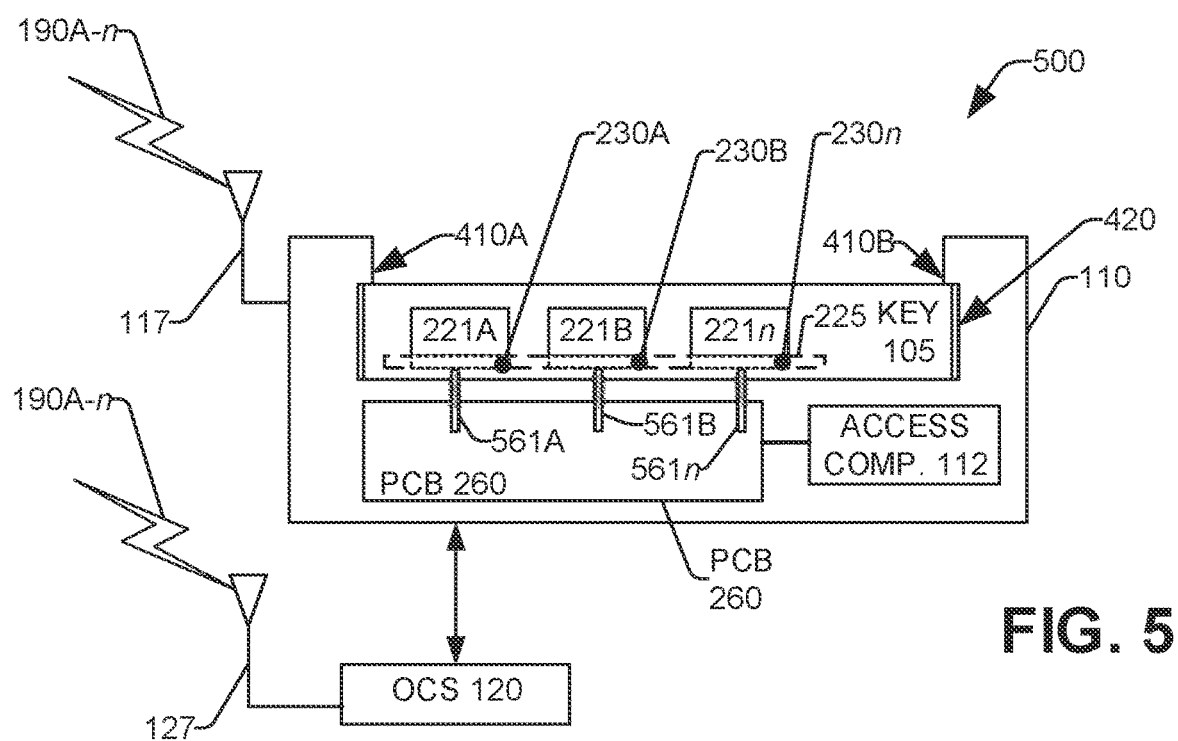
FIG. 5 is a block diagram representation 500 of pin connectors connecting a PCB on a key with a PCB on a key interface, in accordance with various aspects and implementations of the subject disclosure.

Turning to FIG. 5, system 500, in another embodiment, PCB 260 can have a series of pin connectors 561A-n exposed such that when the PCB 225 is placed adjacent to the PCB 260, a respective pin 561A-n on PCB 260 contacts a respective button circuit 230A-n of the buttons 221A-n on PCB 225, thereby electrically connecting key 105 (and PCB 225) to the key interface 110 (and PCB 260). The pin connectors 561A-n can be spring loaded, or similar mechanical structure, to facilitate pressing (engaging) of the respective pin connector 561A-n against a respective button circuit 230A-n. In an embodiment, while not shown, the key 105 can be fabricated such that an outer cover of the key 105 has a removable portion. When the removable portion is removed, the PCB 225 of key 105 is exposed, enabling the respective pin connectors 561A-n to contact the respective circuits 230A-n of PCB 225 for the respective buttons 221A-n. When the key 105 is removed from the key interface 110, the removable portion of the cover can be put back in place, covering the PCB 225.

Figure 6:
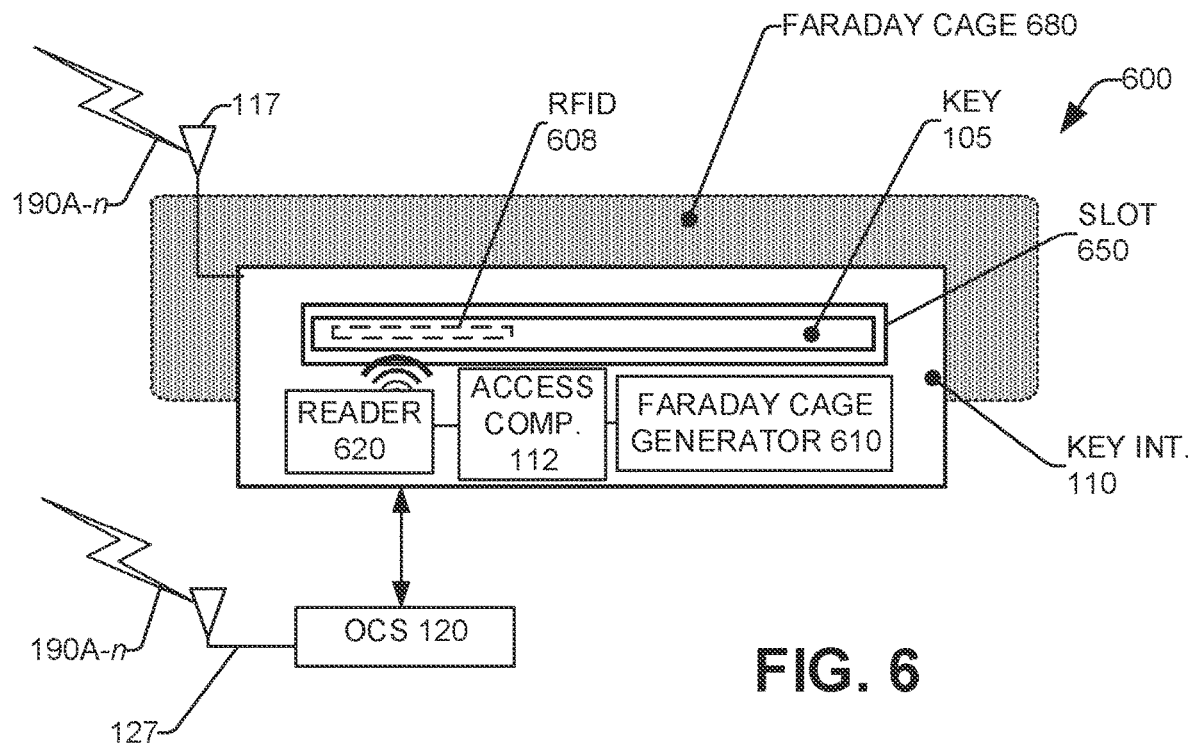
FIG. 6 is a block diagram representation 600 of a smart card key located in a key interface, in accordance with various aspects and implementations of the subject disclosure.

FIG. 6, system 600, presents another embodiment, wherein the key 105 is a smartcard with an embedded RFID 608. In an embodiment, the key interface 110 can have a slot 650 incorporated into it, into which the key 105 can be inserted. In another embodiment, the key 105 can be securely placed on an exterior surface of the key interface 110. The RFID 608 can be read by reader 620, e.g., using near-field technology or other technology enabling interaction with the RFID 608. Until authorization to access operation of the key 105 has been established, a Faraday Cage generator 610 is active and creates a Faraday Cage 680 around the key 105 and RFID 608. The access component 112 can be configured to control operation of the Faraday Cage Generator 610. While the Faraday Cage 680 is active, operational commands (e.g., instructions 172A-n) from either of devices 150 or 160 can be ignored/prevented from reaching key 105. However, once authorization of access to the key interface 110 has been established, e.g., via access component 112, the access component 112 can instruct the Faraday Cage generator 610 to cease operation, causing the Faraday Cage 680 to be removed, and communications (e.g., via signals 190A-n) between either of the devices 150 or 160 and the key interface 110 to occur.

The key interface 110 can be coupled to the OCS 120, wherein the OCS 120 can be configured to monitor and control various operations performed during access and operation of the vehicle 102. Such operations can include monitoring and controlling operation of vehicle 102's propulsion system (e.g., engine), operation of headlights while driving under different conditions, etc. As further shown in FIG. 1, the OCS 120 can be communicatively coupled to a presentation component, a HMI 128 (e.g., a display, a graphical-user interface (GUI), and the like). HMI 128 can be incorporated into an instrument cluster, dashboard, etc., of vehicle 102. The HMI 128 can be configured to receive and present various operational information, location information, GPS data, data, alerts, instructions, and the like, to an operator (e.g., a driver) of the vehicle 102 regarding operation and/or operating conditions of the vehicle 102, wherein the information, data, etc., can be presented via one or more screens (not shown). In an embodiment, as well as a person being able access the vehicle 102 as a function of authentication of the key 105 and key interface 110, the authentication process also enables the person to view/access/interact with content displayed on an interactive display of the HMI 128.

Figure 7:
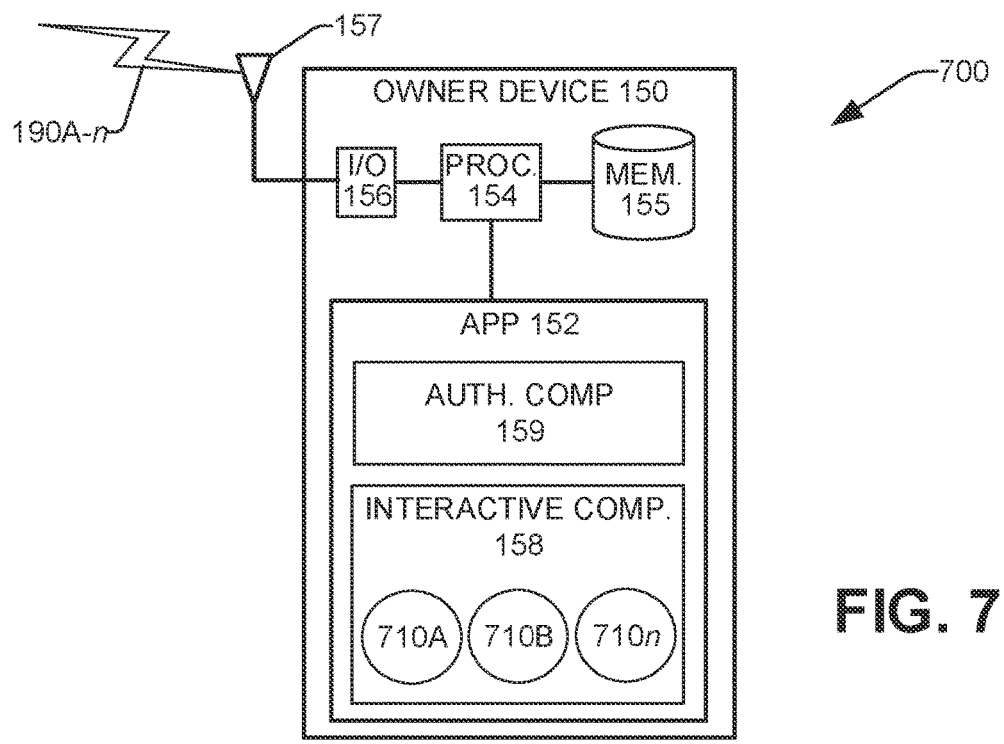
FIG. 7 is a block diagram representation 700 illustrating a mobile device with various components and functionality, in accordance with various aspects and implementations.

Per the various embodiments presented herein, an owner of the vehicle 102 can have the key interface 110 installed on the vehicle 102 with the key 105 attached thereto. Referring to FIG. 1 in conjunction with FIG. 7, FIG. 7 presents a system 700 in accordance with an embodiment, illustrating the owner device 150, e.g., the owner's cellphone. In an embodiment, the owner can interact with the key interface 110 via a software application 152 operating on the owner device 150. Owner device 150 can be any of a smartphone, a mobile phone, a cellphone, a personal digital assistant (PDA), a handheld computing device, a smartwatch, a tablet computer, a laptop computer, or any other suitable device to facilitate one or more embodiments herein. The key interface 110 can have a copy of the software application operating thereon, e.g., operating as part of the access component 112. The software application 152 and the access component 112 can be configured such that as authentication keys 170A-n are generated and synchronized (e.g., between an authentication component 159 operating on the owner device 150 and access component 112), the owner of vehicle 102 can use the owner device 150 to interact with the key interface 110, and one or more operations performed by the key 105. As shown in FIG. 7, various buttons 710A-n can be presented on a screen of the owner device 150, wherein the buttons 710A-n can be configured to function in a manner comparable to physically pressing any of buttons 221A-n on the key 105. For example, upon selection of button 710A, a signal 190A can be transmitted from the owner device 150 to the key interface 110, wherein the signal 190A includes an instruction 172A (e.g., in various instructions 172A-n) indicating that button 710A has been selected on the owner device 150 and button 221A should be activated on the key 105/key interface 110 (e.g., button 221A is configured to open door of vehicle 102). Accordingly, the interaction between the owner device 150 and application 162 with the key interface 110 and access component 112 enables accessing and operation of vehicle 102 to be similar to that of a smart vehicle.

Extending the foregoing concepts, in an embodiment, the system 100 can further comprise a requesting device 160, having software application 162 operating thereon, wherein software application 162 can provide functionality similar to software application 152, as previously described. The owner device 150 can be referred to as a first mobile device, and the requesting device 160 can be referred to as a second mobile device. Software application 162 can be configured to interact with any of owner device 150, key interface 110, and/or registration system 180. For example, in a scenario where requesting device 160 is interacting with key interface 110, buttons can be presented on a screen of the requesting device 160 for selection and control of buttons 221A-n on the key 105. The buttons presented on the requesting device 160 can be comparable in look and function to buttons 710A-n presented on owner device 150, as shown in FIG. 7.

In another embodiment, the system 100 can further comprise a registration system 180, having software application 182 operating thereon, wherein the registration system 180 is configured to operate with owner device 150, key interface 110, and/or requesting device 160. Registration system 180 can be utilized to facilitate sharing of authentication keys 170A-n between the owner device 150 and requesting device 160, e.g., where the owner operates a rental fleet of vehicles, for example. In a further embodiment, the system 100 can further be configured with communications (e.g., any of 190A-n) established between any of the owner device 150, key interface 110, requesting device 160, registration system 180, and/or OCS 120 interacting therebetween.

As shown in FIGS. 1 and 7, the various systems and devices can include at least one processor (e.g., processor 114, 124, 154, 164, 184) and at least one memory (e.g., memory 115, 125, 155, 165, 185), respectively located on the key interface 110, the OCS 120, the owner device 150, the requesting device 160, and/or the registration system 180. Functions performed and functionality provided by the at least one processor can include execution of various computer-executable components, functions, operations, etc., at the respective system and or device, as presented herein. The respective memory can be utilized to store the various computer-executable components, functions, code, etc., for execution and operation by a processor associated with the respective memory. The respective memory can further store information and data (e.g., authentication keys 170A-n, access requests 171A-n, instructions 172A-n) to enable execution (e.g., by the respective processor) of the device authentication process, access request process, operation of key 105 and/or key interface 110, and the like.

As further shown, the various systems and devices can respectively include an input/output (I/O) component (e.g., I/O component 116, 126, 156, 166, 186), wherein an I/O component can be configured to operate as a transceiver configured enable transmitting/receiving/processing of various signals (e.g., any of signals 190A-n) comprising authentication codes, digital signatures, synchronization codes, instructions, commands, information, data, and the like (e.g., authentication keys 170A-n, access requests 171A-n, instructions 172A-n) between any of the key 105, the key interface 110, the OCS 120, the owner device 150, the requesting device 160, and/or the registration system 180, as located onboard, or remote to, the vehicle 102. Also, as further shown, the various devices presented in FIG. 1 can further include an antenna 117, 127, 157, 167, 187, which can be utilized to transmit communication signals (e.g., any of signals 190A-n) between the respective devices and components located on and/or remotely located to the vehicle 102. Depending upon the configuration being utilized, as further described herein, any of antennas 157, 167, or 187 of the remotely located devices 150, 160, 180, can be interacting with the onboard devices 105, 110, 120, as shown by the "remote device antenna 157, 167, 187" on FIG. 1.

Any suitable technology can be utilized to enable the various embodiments presented herein, e.g., authorizing a device 150 or 160 to have access to the key interface 110, transmission of commands between devices 150 and 160, registration system 180, key interface 110, and suchlike. Suitable technologies include BLUETOOTH®, cellular technology (e.g., 3G, 4G, 5G), internet technology, ethernet technology, ultra-wideband (UWB), DECAWAVE®, IEEE 802.15.4a standard-based technology, Wi-Fi technology, Radio Frequency Identification (RFID), Near Field Communication (NFC) radio technology, and the like.

Figure 8:
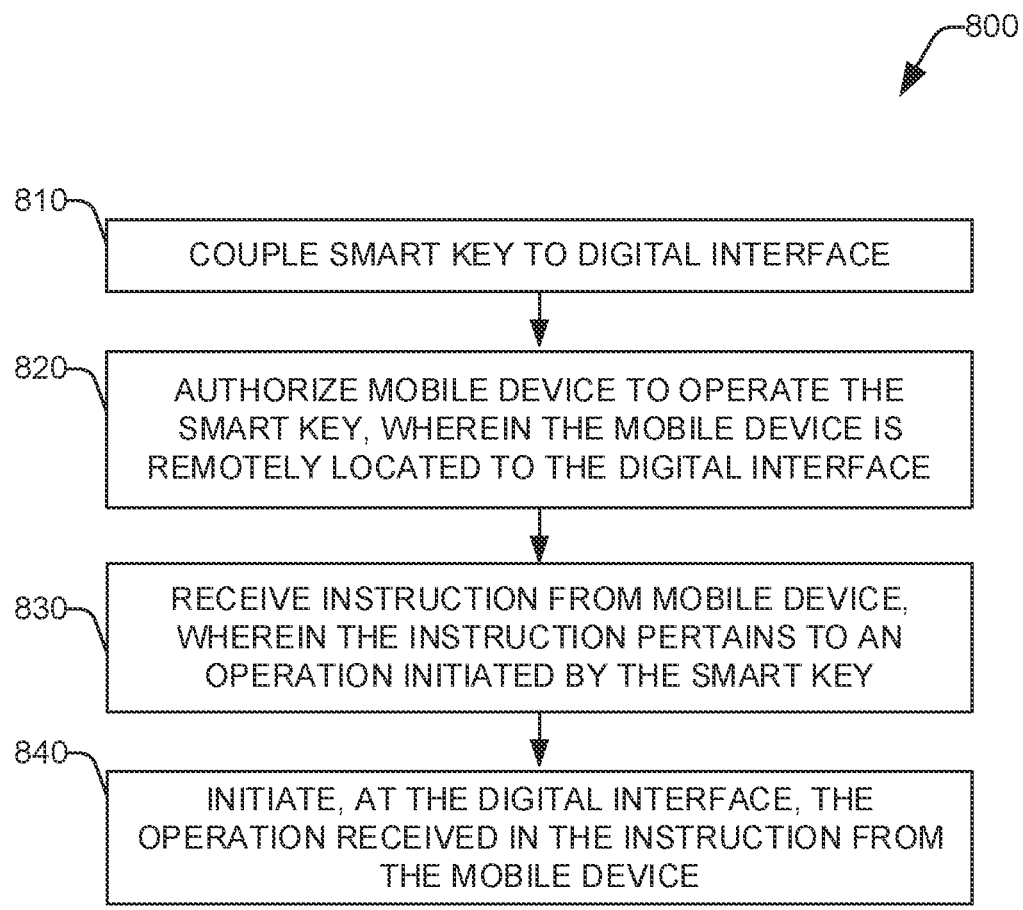
FIG. 8 is a flow diagram for a computer-implemented methodology 800 for controlling access and operation of a smart key by a remotely located device, in accordance with various aspects and implementations of the subject disclosure.

FIG. 8 illustrates a flow diagram for a computer-implemented methodology 800 for controlling access and operation of a smart key by a remotely located device, in accordance with at least one embodiment.

At 810, a smart key (e.g., key 105) is coupled to a digital interface (e.g., key interface 110). As described herein, coupling of the smart key to the digital interface can comprise of any of hardwired electrical connections (e.g., button connection circuits 230A-n hardwired to PCB connections 261A-n), buttons operated by actuators (e.g., buttons 221A-n and actuators 335A-n), pin connections (e.g., pins 561A-n and button connections 230A-n), and such like. The digital interface can be configured to receive instructions from one or more external devices (e.g., mobile devices 150, 160), and simulate operation of one or more buttons (e.g., buttons 221A-n) of the smart key.

At 820, the digital interface can be configured to control access of the one or more external devices to operate the smart key buttons. Access can be controlled by any suitable technology utilized for authenticating one or more devices (e.g., authentication keys 170A-n, authentication certificates, digital signatures, and the like). For example, access authentication can be based upon comparison of shared authentication keys/certificates/signatures to confirm that a first authentication key matches an original authentication key generated to grant access to digital interface and the smart key.

At 830, in the event of a mobile device is authorized and granted access to generate one or more smart key operations, instructions can be received from the mobile device in accord with the smart key button operations, e.g., lock/unlock door, etc.

At 840, the digital interface can initiate the operation at the smart key in accord with the one or more instructions received from the mobile device (e.g., at 830). For example, an instruction can be to unlock the door, upon which the door on the vehicle (e.g., vehicle 102) can be unlocked by the digital interface (e.g., as a result of a relay operating at either the button circuit 221A-n or the PCB circuit connection 261A-n).

Figure 9:
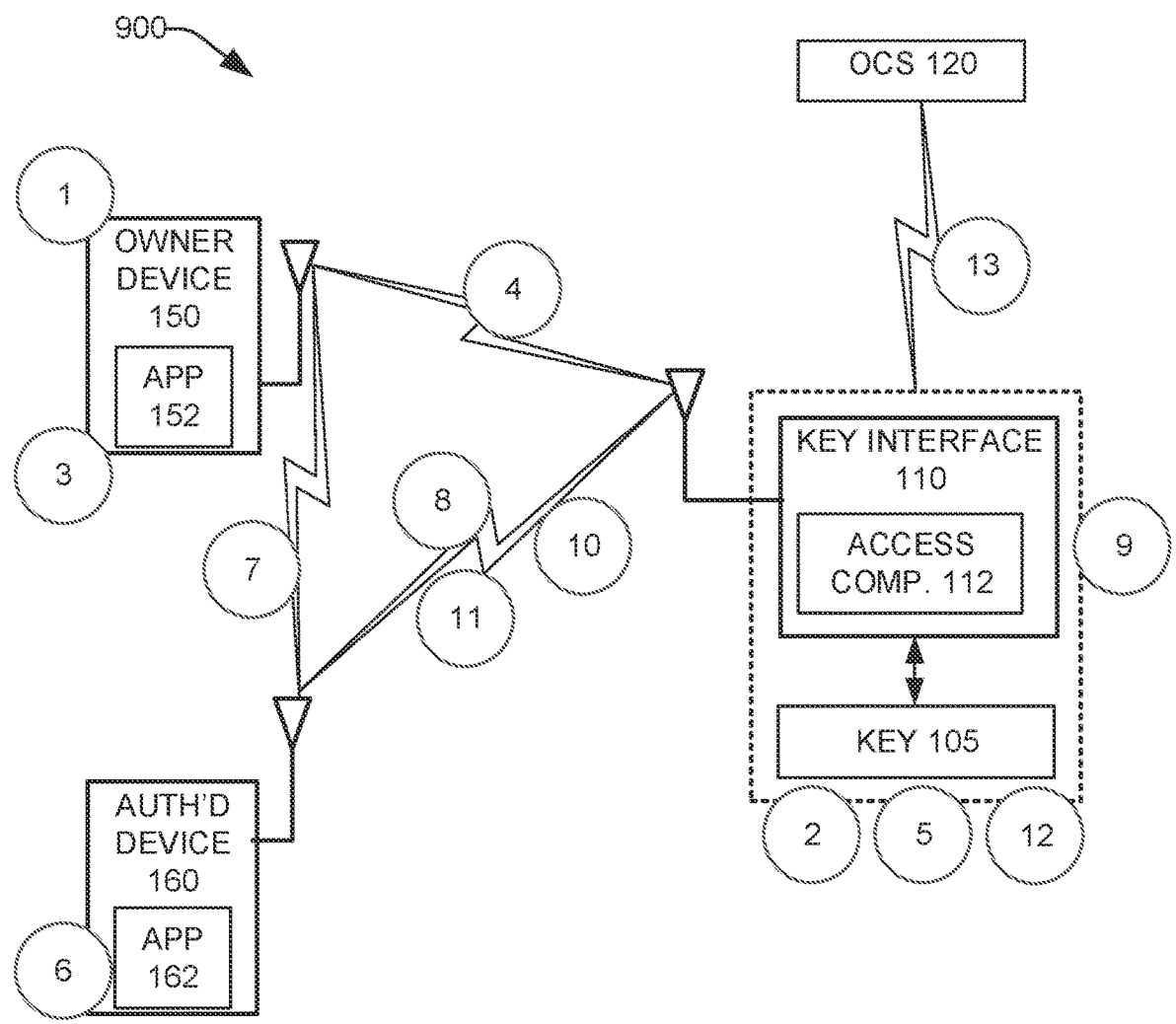
FIG. 9 is a block diagram representation 900 of devices and operations performed during authentication and accessing of a key interface by an owner device and a requesting device, in accordance with various aspects and implementations of the subject disclosure.
Figure 10:
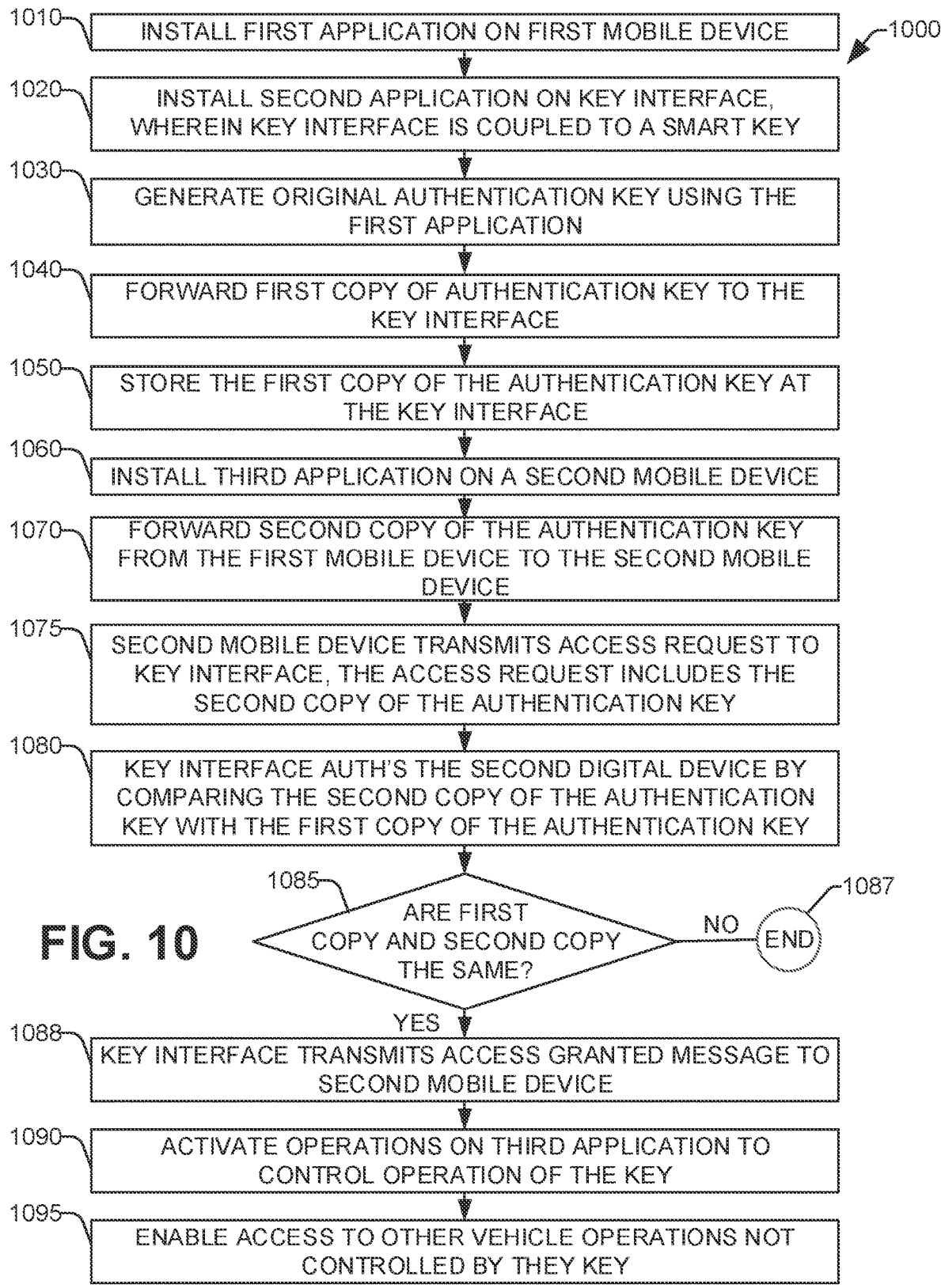
FIG. 10 is a flow diagram for a computer-implemented methodology 1000 regarding operations performed by devices during authentication and accessing of a key interface by an owner device and a requesting device, in accordance with various aspects and implementations of the subject disclosure.

Various communications can occur between various devices, based upon the approach selected from the various techniques for authenticating the respective devices, authentication key sharing, key commands, etc. To aid understanding FIG. 9 and FIG. 10 can be read concurrently, such that an act or step in methodology 1000 can be identified in the system drawing 900, accordingly, operations presented in FIG. 9 are referenced as (1)-(13) with corresponding acts/steps presented in FIG. 10 as 1010-1095. FIG. 9, system 900, presents an example scenario comprising various operations and activities performed during authentication and accessing of the key interface 110 by an owner device 150 and a requesting device 160. FIG. 10 is a flow diagram 1000 presenting example operations conveyed in FIG. 9, in accord with one or more embodiments.

At (1)/1010, the software application 152 is installed on the owner device 150. Software application 152 can be configured to interact directly with the key interface 110, and further, authenticate a second mobile device, e.g., requesting device 160 to access the interface 110.

At (2)/1020 a software application, access application 112 is further installed on the key interface 110, wherein the access application 112 can be configured to authenticate a request for access to the key interface 110 and further, control access and/or operation of the key interface 110, e.g., how key interface 110 interacts with the key 105, as well as how the key interface 110 interacts with other devices and components such as OCS 120, the owner device 150, the requesting device 160, and suchlike.

At (3)/1030, application 152 on device 150 can generate an original authentication key 170A (also referred to as original authentication key, digital signature), wherein the original authentication key 170A is stored locally (e.g., in memory 155).

At (4)/1040 the application 152 can be configured to forward (e.g., in signal 190A) a copy 170B of the authentication key 170A to the access application 112/key interface 110.

At (5)/1050, on receipt of the authentication key 170A, the access application 112 can be configured to store the copy 170B of the authentication key locally (e.g., in memory 115) for subsequent authentication of an access request.

At (6)/1060, a further copy of the software application 162 can be installed on the requesting device 160.

At (7)/1070, an information/data exchange can occur between owner device 150 and requesting device 160 whereby a copy of the authentication key (herein labelled as authentication key 170C) is forwarded from the owner device 150 to the requesting device 160. Communications and information sharing between the owner device 150 and the requesting device 160 can be in a "peer to peer". In an embodiment, the forwarding of the authentication key (authentication key 170C) can be via any suitable technology, e.g., by placing owner device 150 and requesting device 160 in close proximity such that the authentication key (authentication key 170C) can be transferred using BLUETOOTH® or similar technology. In another embodiment, forwarding of the authentication key (authentication key 170C) can be via the internet technology, cellphone technology, etc.

At (8)/1075, the requesting device 160 can transmit an access request 171A to the key interface 110. In an embodiment, during interaction between the requesting device 160 and the key interface 110, the requesting device 160 is located at a distance from the vehicle 102 such that communications between the requesting device 160 and the key interface 110 can be conducted using short range wireless technology such as BLUETOOTH® and the like. The access request 171A can include the copy of the authentication key 170C.

At (9)/1080 the access application 112 can compare the copy of authentication key 170B received from the owner device 150 with the copy of the authentication key 170C received from the requesting device 160.

At (10)/1085, in response to determining that the authentication keys DO NOT match, the access application 112 can transmit a message to the requesting device 160 that access is denied, or alternatively, no interaction occurs between the key interface 110 and the requesting device 160. Methodology 1000 can end at 1087.

Returning to (10)/1085, in response to determining that the authentication keys DO match, the operations can advance to (11)/1088, whereby the access application 112 can transmit a message to the requesting device 160 that access is granted and further, that vehicle operation options on application 162 can be activated for access to vehicle 102.

At (12)/1090, in response to the access granted message, the various operation options on the application 162 can be activated for interaction between the requesting device 160 and the key interface 110 for operation of vehicle 102.

At (13)/1095, the access application 112 can further extend access and operation of the vehicle 102, such that the access application 112 can be configured to inform the OCS 120 that operation of vehicle 102 is granted to the requesting device 160. Accordingly, the HMI 128 can be activated by the OCS 120, along with any other features available to the user of the requesting device 160 as needed to operate vehicle 102.

Figure 11B:
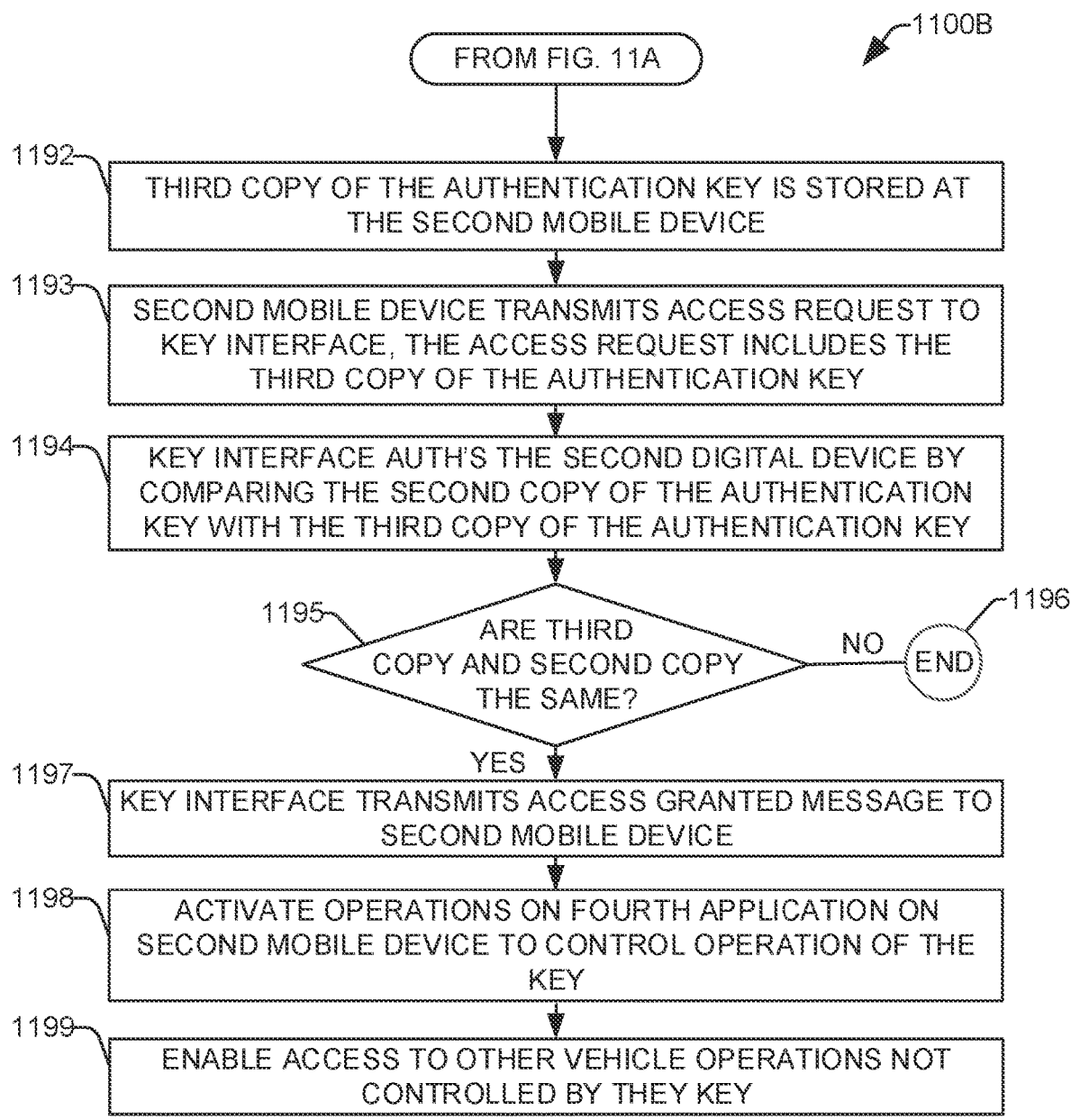

FIGS. 11A and 11B, flow diagram 1100, presents another example scenario of operation of a smart key by a remote device, in accord with one or more embodiments.

At 1110, a first version of a software application (e.g., software application 152) is installed on a first mobile device (e.g., owner device 150).

At 1120, a second version of the software application (e.g., software application 112) is installed on a key interface (e.g., key interface 110), wherein the key interface is configured to replicate operation of a smart key coupled to the key interface. The smart key is configured to perform one or more operations at a vehicle, e.g., open vehicle door, and the like.

At 1130, a third version of the software application (e.g., software application 182) is installed on a registration system (e.g., registration system 180), wherein the registration is configured to communicate with any of the first mobile device, the key interface, the smart key, and a second mobile device.

At 1140, a fourth version of the software application (e.g., software application 162) is installed on the second mobile device (e.g., requesting device 160). In an embodiment, the registration system can be a central system operating at, for example, a car fleet office, a car rental/hire office, and the like. Furthering the example, the owner of the second mobile device wants to rent a vehicle, however, the car is operated with a smart key. Rather than, as with conventional operations, giving the owner of the second mobile device the smart key, the second mobile device can have the fourth version of the software application stored thereon, in conjunction with an authentication key, enabling the second mobile device to communicate with the key interface in a "smart" manner.

At 1150, an original version of an authentication key (e.g., authentication key 170A) is generated at the first mobile device.

At 1160, a first copy of the authentication key (e.g., authentication key 170B) is transmitted from the first mobile device to the registration system.

At 1170, the first copy of the authentication key is saved at the registration system.

At 1180, a second copy of the authentication key (e.g., authentication key 170C) is transmitted to the key interface.

At 1185, the second copy of the authentication key is saved at the key interface.

At 1190, the second mobile device can request access (e.g., in an access request 171A) to the key interface, wherein the request is made to the registration system.

At 1191, in response to the request to access the key interface by the second mobile device, a third copy of the authentication key (e.g., authentication key 170D) can be generated at the registration system and transmitted from the registration system to the second mobile device.

At 1192, the third copy of the authentication key is stored at the second mobile device (e.g., in memory 165).

At 1193, an access request (e.g., access request 171B) is transmitted from the second mobile device to the key interface, wherein the access request can include the third copy of the authentication key.

At 1194, the software application on the key interface can compare the second copy of the authentication key previously stored at the key interface with the third copy of the authentication key received from the first mobile device.

At 1195, in response to determining that the second and third copies of the authentication keys DO NOT match, the access application can transmit a message (access request message 171B) to the second mobile device indicating that access is denied, or alternatively, no interaction occurs between the key interface and the second mobile device. Methodology 1100 can end at 1196.

Returning to 1195, in response to determining that the second and third copies of the authentication keys DO match, the operations can advance to 1197, whereby the access application can transmit a message (access request message 171C) to the second mobile device that access is granted and further, that vehicle operation options on the second software application can be activated for access to the vehicle.

At 1198, in response to the access granted message, the various operation options on the fourth application operating on the second mobile device can be activated for interaction between the second mobile device and the key interface/smart key for operation of the vehicle.

At 1199, the second software application operating at the key interface can further extend access and operation of the vehicle, such that the second software application can be configured to inform an OCS (e.g., OCS 120) at the vehicle, that operation of the vehicle is granted to the second mobile device. Accordingly, a HMI (e.g., HMI 128) operating in conjunction with the OCS, is made available to an operator of the second mobile device along with any features as needed/configured to operate vehicle.

Figure 12:
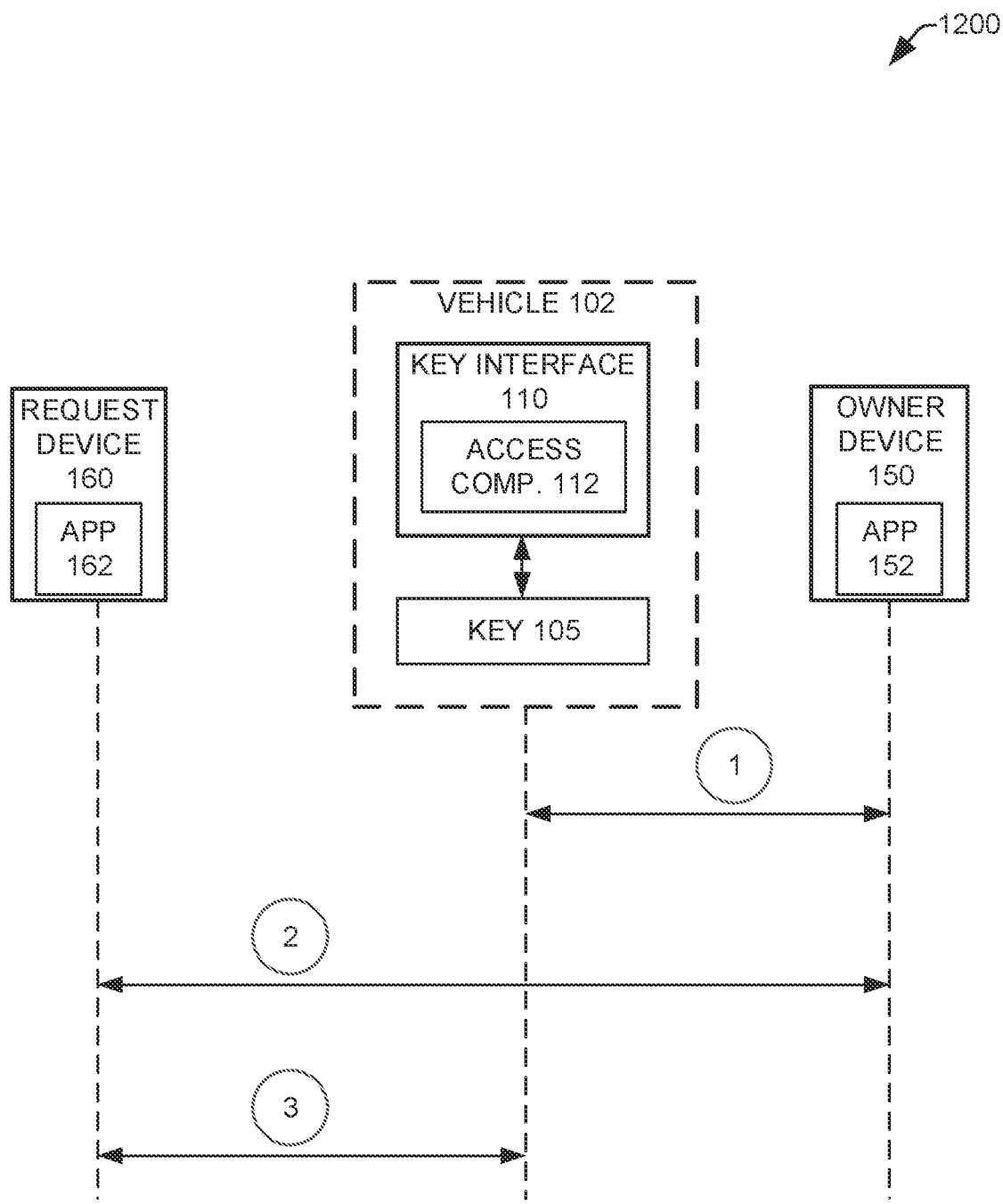
FIG. 12 presents a schematic illustrating a peer-to-peer security protocol that enables one party to cryptographically verify "ownership" of a vehicle from another party based on public keys and signatures from trusted third parties

FIG. 12 presents an embodiment utilizing a peer-to-peer security protocol that enables one party (e.g., the key interface 110) to cryptographically verify any type of data (e.g., ownership of the vehicle 102) from another party (e.g., requesting device 160) based on public keys and signatures from trusted third parties (e.g., owner device 150).

As shown in FIG. 12, three parties are involved: owner device 150, the key interface 110 (and access component 112), and the requesting device 160. In an embodiment, the requesting device 160 wants to establish ownership of the vehicle 102, and thereby operate functions available for key 105. The key interface 110 is configured to accept encrypted data from parties such as the requesting device 160 and verify ownership of the vehicle 102 by the requesting device 160. To enable the requesting device 160 asserting ownership, the key interface 110 relies on cryptographic signatures from a trust third party, the owner device 150. The owner device 150 can create cryptographic signatures that can be used to certify ownership of the vehicle 102, e.g., by the requesting device 160. With the owner device 150 being trusted by both the key interface 110 and the requesting device 160, the key interface 110 can authorize access by the requesting device 160.

In the embodiment presented in FIG. 12, the following terms are utilized: A party is any of the owner device 150, the key interface 110, the requesting device 160; an Identity key is used to cryptographically identify a party; Signatures are used to cryptographically verify ownership and integrity of a party's identity key and "ownership" of the vehicle 102; and Certificates contain pairs of identity keys and signatures from the parties that have verified the ownership and integrity of a party's identity key and "ownership" of the vehicle 102. A list of identity keys from trusted parties can be used to verify that one or more certain third parties have verified the ownership and integrity of a party's identity key and "ownership" of the vehicle 102. The integrity and ownership can be verified for any type of data, wherein here, data is "ownership" of the vehicle 102.

As shown in FIG. 12, the peer-to-peer security protocol comprises three stages: (1) Establish Trust, (2) Certify Ownership, and (3) Verify ownership.

STAGE 1—Establish Trust: The key interface 110 (e.g., access component 112) and the owner device 150 (e.g., application 152) mutually authenticate each other, wherein the key interface 110 adds the owner device 150 as a trusted party (e.g., in memory 115). Effectively, the ownership is establishing ownership of the vehicle 102.

STAGE 2—Certify Ownership: The requesting device 160 (e.g., application 162) and the owner device 150 (e.g., application 152) mutually authenticate each other. The owner device 150 creates a signature that certifies the requesting device's 160 ownership of the vehicle 102. The requesting device 160 adds the signature and owner device's 150 public key to a certificate.

STAGE 3—Verify Ownership: the requesting device 160 authenticates with the key interface 110 using the certificate with the owner device's 150 public key and signature. The key interface 110 can verify the requesting device's 160 ownership of the vehicle 102 without further contact with the owner device 150.

In an embodiment, STAGES 1-3 can be conducted using any communication process between the respective parties, e.g., using BLUETOOTH® or other suitable technology. Accordingly, per FIG. 12, the STAGE 1-3 can be performed via near-field technology, such as BLUETOOTH®, hence, no internet access is necessary by any of the devices. Per the foregoing, once STAGE 3 has been conducted and the requesting device 160 has verified ownership of the vehicle 102, the application 162 operating on the requesting device 160 can be granted access (e.g., by access component 112) to operate the key 105.

Example Applications and Use

Figure 13:
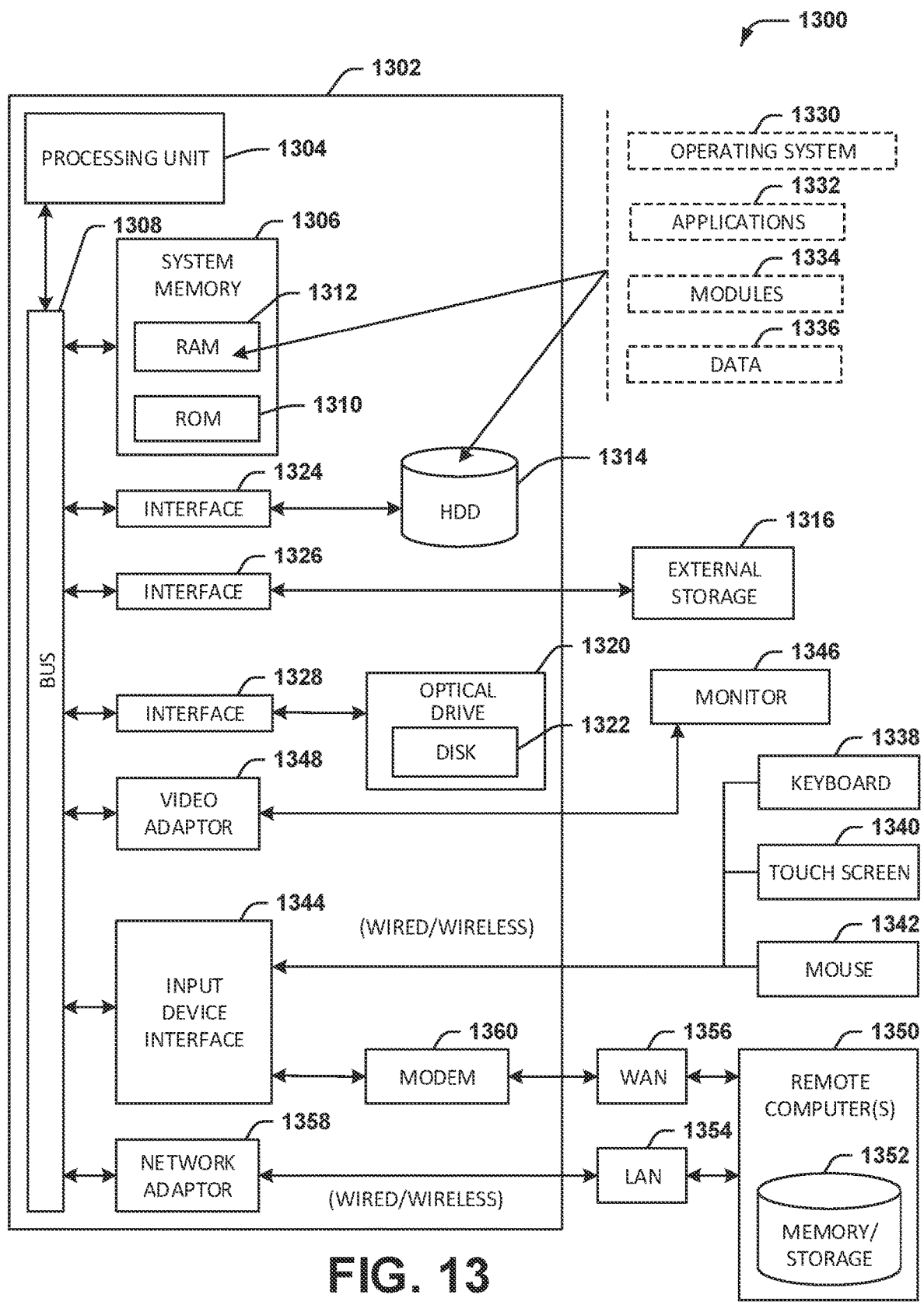
FIG. 13 depicts an example schematic block diagram 1300 of a computing environment with which the disclosed subject matter can interact/be implemented at least in part, in accordance with various aspects and implementations of the subject disclosure.
Figure 14:
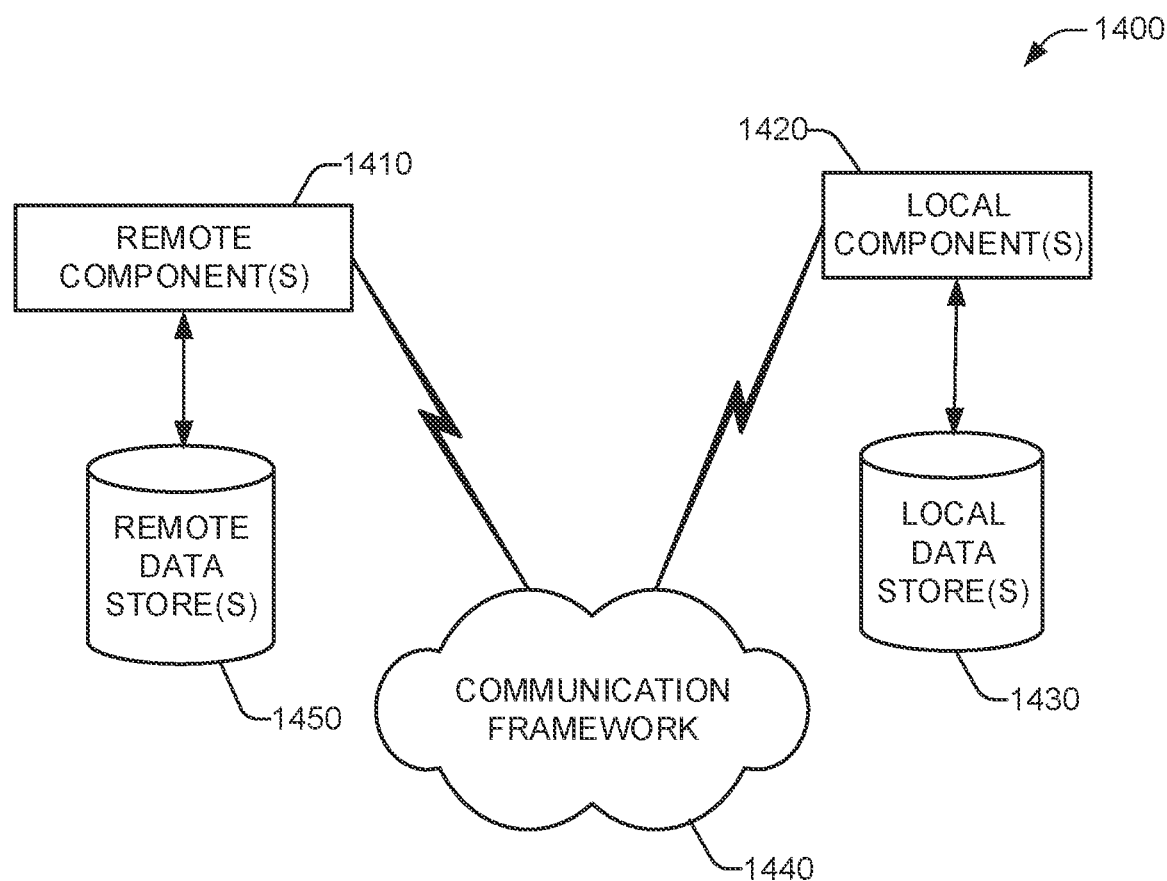
FIG. 14 is a block diagram 1400 representing an example computing environment into which aspects of the subject matter described herein may be incorporated.

Turning next to FIGS. 13 and 14, a detailed description is provided of additional context for the one or more embodiments described herein with FIGS. 1-12.

In order to provide additional context for various embodiments described herein, FIG. 13 and the following discussion are intended to provide a brief, general description of a suitable computing environment 1300 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors and may include a cache memory. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS)

can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid-state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can comprise a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Referring now to details of one or more elements illustrated at FIG. 14, an illustrative cloud computing environment 1400 is depicted. FIG. 14 is a schematic block diagram of a computing environment 1400 with which the disclosed subject matter can interact. The system 1400 comprises one or more remote component(s) 1410. The remote component(s) 1410 can be hardware and/or software (e.g., threads, processes, computing devices). In some embodiments, remote component(s) 1410 can be a distributed computer system, connected to a local automatic scaling component and/or programs that use the resources of a distributed computer system, via communication framework 1440. Communication framework 1440 can comprise wired network devices, wireless network devices, mobile devices, wearable devices, radio access network devices, gateway devices, femtocell devices, servers, etc.

The system 1400 also comprises one or more local component(s) 1420. The local component(s) 1420 can be hardware and/or software (e.g., threads, processes, computing devices). In some embodiments, local component(s) 1420 can comprise an automatic scaling component and/or programs that communicate/use the remote resources 1410 and 1420, etc., connected to a remotely located distributed computing system via communication framework 1440.

One possible communication between a remote component(s) 1410 and a local component(s) 1420 can be in the form of a data packet adapted to be transmitted between two or more computer processes. Another possible communication between a remote component(s) 1410 and a local component(s) 1420 can be in the form of circuit-switched data adapted to be transmitted between two or more computer processes in radio time slots. The system 1400 comprises a communication framework 1440 that can be employed to facilitate communications between the remote component(s) 1410 and the local component(s) 1420, and can comprise an air interface, e.g., Uu interface of a UMTS network, via a long-term evolution (LTE) network, etc. Remote component(s) 1410 can be operably connected to one or more remote data store(s) 1450, such as a hard drive, solid state drive, SIM card, device memory, etc., that can be employed to store information on the remote component(s) 1410 side of communication framework 1440. Similarly, local component(s) 1420 can be operably connected to one or more local data store(s) 1430, that can be employed to store information on the local component(s) 1420 side of communication framework 1440.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client entity," "consumer," "client entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

While not an exhaustive listing, providing an overview of various embodiments, but not all embodiments, presented herein:

1. A system, comprising: a smart key configured to interact with a vehicle, the smart key comprising a button, wherein, when selected, the button is configured to initiate an operation on the vehicle; and a key interface coupled to the smart key, wherein the key interface is configured to: receive an instruction; and in response to receiving the instruction, the key interface duplicates operation of the button, causing initiation of the vehicle operation.

2. The system of claim 1, wherein the key interface further comprises a transceiver configured to receive a signal, the signal includes the instruction.

3. The system of any preceding clause, wherein the signal is a short-range wireless signal.

4. The system of claim 1, wherein the key interface further comprises an access component configured to receive a digital identifier, wherein the digital identifier is a unique identification configured for the vehicle.

5. The system of any preceding clause, wherein the access component is further configured to: receive a digital certificate comprised of the unique identifier configured for the vehicle and a digital signature which is linked to the vehicle's unique identifier; verify the digital signature; and in response to the digital signature being verified, grant access to a remotely located device to control operation of the button.

6. The system of any preceding clause, wherein in response to the digital signature not being verified, the access component is configured to refuse access by the remotely located device to control operation of the button.

7. The system of claim 1, wherein the smart key further comprises a first printed circuit board (PCB) and the key interface comprises a second PCB, a first connection on the first PCB is hardwired to a second connection on the second PCB to connect the button on smart key to the key interface.

8. The system of claim 1, wherein the smart key further comprises a first printed circuit board (PCB) and the key interface comprises a second PCB, a first connection on the first PCB is electrically connected to a second connection on the second PCB by a spring-loaded connecting pin to connect the button on the smart key to the key interface.

9. The system of claim 1, wherein the smart key comprises a smart card with an incorporated radio frequency identification device (RFID) and the key interface further comprises a Faraday Cage component configured to prevent access to the RFID until an authentication process has been successfully performed.

10. The system of claim 1, wherein the instruction is received from a device remotely located from the key interface.

11. The system of any preceding clause, wherein the remotely located device is one of a smartphone, a mobile phone, a cellphone, a personal digital assistant (PDA), a handheld computing device, a smartwatch, a tablet computer, or a laptop computer.

12. A system, comprising: a memory that stores computer executable components; and a processor that executes the computer executable components stored in the memory, wherein the computer executable components comprise: an access component located on a key interface co-located with a smart key, wherein the key-interface is located on a vehicle, the access component is configured to: receive, from a remotely located device, an access request comprising a digital certificate which includes a digital signature that is linked to a unique identifier configured for the vehicle; verify the access request; and in response to the digital signature being verified, granting control of the smart key by the remotely located device.

13. The system of claim 12, wherein the first digital signature is generated by a first device configured to operate the smart key, the smart key controls at least one operation of the vehicle.

14. The system of any preceding clause, wherein the operation is one of unlock a door of the vehicle, unlock a trunk of the vehicle, or start an engine configured to propel the vehicle.

15. The system of claim 12, wherein the smart key further comprises a printed circuit board (PCB), and the access component is further configured to: receive a command signal from the remote device, wherein the command signal pertains to a first operation of the smart key; and activating a connection on the PCB configured for the first operation of the smart key.

16. The system of claim 12, wherein the remotely located device is one of a smartphone, a mobile phone, a cellphone, a personal digital assistant (PDA), a handheld computing device, a smartwatch, a tablet computer, or a laptop computer.

17. The system of claim 12, wherein the smart key is hardwired to the key interface.

18. A computer-implemented method for controlling operation of a vehicle comprising: receiving, from a remotely located device, an access request comprising a first digital signature, wherein the access request is received at a key interface electrically coupled to a smart key configured to initiate an operation on the vehicle; comparing the access request with a second digital signature stored at the key interface; and in response to the first digital signature matching the second digital signature, enabling operation of the smart key by the remotely located device.

19. The computer-implemented method of claim 18, wherein the operation is one of unlock a door of the vehicle, lock a door of the vehicle, unlock a trunk of the vehicle, lock a trunk of the vehicle, open a trunk of the vehicle, close a trunk of the vehicle, start an engine configured to propel the vehicle, stop the engine, activating a key battery, deactivating a key battery, or any other operation provided on a smart key.

20. The computer-implemented method of claim 18, wherein the remotely located device is one of a smartphone, a mobile phone, a cellphone, a personal digital assistant (PDA), a handheld computing device, a smartwatch, a tablet computer, or a laptop computer.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a memory that stores computer executable components; and
a processor that executes the computer executable components stored in the memory, wherein the computer executable components comprise:
a key interface configured to interact with a physical key that comprises an embedded radio frequency identification device (RFID) that enables control of a set of operations of a vehicle, wherein the physical key is physically locked in the key interface, and wherein the key interface comprises a faraday cage generator; and
an access component configured to control operation of the key interface, and further configured to:
control the key interface to establish, via the faraday cage generator, a faraday cage around the physical key that blocks transmissions from the embedded RFID to disable control of the set of operations of the vehicle;
receive a first cryptographic signature from a first device associated with an owner of the vehicle;
receive an access request from a second device associated with an entity requesting access to the key interface, wherein the access request includes a second cryptographic signature;
determining whether the first cryptographic signature and the second cryptographic signature are verified; and
in response to a determination that the first cryptographic signature and the second cryptographic signature are verified:
control the key interface to remove, via the faraday cage generator, the faraday cage around the physical key to enable transmissions from the embedded RFID to enable control of the set of operations of the vehicle.

2. The system of claim 1, wherein the access component is further configured to, in response to a determination that the first cryptographic signature and the second cryptographic signature do not match, deny the second device access to the key interface.

3. The system of claim 1, wherein the second cryptographic signature, received from the second device, is generated by the first device as a copy of the first cryptographic signature.

4. The system of claim 1, wherein communication between at least one of the first device and the access component is via short range wireless communication technology, or the second device and the access component is via short range wireless communication technology.

5. The system of claim 1, wherein the system is located on the vehicle, and the physical key is configured to perform at least one of unlock at least one door of the vehicle, lock the at least one door of the vehicle, start an engine located on board the vehicle, stop operation of the engine located on board the vehicle, open a tailgate to access a trunk of the vehicle, or close a trunk tailgate of the vehicle.

6. The system of claim 1, wherein the first device is one of a smartphone, a mobile phone, a cellphone, a personal digital assistant (PDA), a handheld computing device, a smartwatch, a tablet computer, or a laptop computer.

7. The system of claim 1, wherein the second device is one of a smartphone, a mobile phone, a cellphone, a personal digital assistant (PDA), a handheld computing device, a smartwatch, a tablet computer, or a laptop computer.

8. The system of claim 5, wherein the access component, in response to the determination that the first cryptographic signature and the second cryptographic signature are verified, is further configured to grant the second device access to the key interface to enable remote interaction with the physical key.

9. The system of claim 1, wherein the access component is further configured to:
generate a confirmation of access request granted;
forward the confirmation to the second device; and
forward notification of the confirmation to the first device.

10. A computer-implemented method, comprising:
receiving, by a processor of a key interface installed in vehicle, a first cryptographic signature from a first device associated with an owner of the vehicle, wherein the key interface is configured to interact with a physical key that comprises an embedded radio frequency identification device (RFID) that enables control of controls a set of operations of the vehicle, wherein the physical key is physically locked in the key interface, and wherein the key interface comprises a faraday cage generator;
establishing, by the processor, via the faraday cage generator, a faraday cage around the physical key that blocks transmissions from the embedded RFID to disable control of the set of operations of the vehicle;
receiving, by the processor, an access request from a second device associated with an entity requesting access to the key interface, wherein the access request includes a second cryptographic signature;
determining, by the processor, whether the first cryptographic signature and the second cryptographic signature are verified; and
in response to a determination that the first cryptographic signature and the second cryptographic signature are verified, removing, by the processor, via the faraday cage generator, the faraday cage around the physical key to enable transmissions from the embedded RFID to enable control of the set of operations of the vehicle.

11. The computer-implemented method of claim 10, wherein, at least one of the first device or the second device is communicatively coupled to the key interface via short range wireless communication technology.

12. The computer-implemented method of claim 10, wherein the second cryptographic signature is generated by the first device as a copy of the first cryptographic signature.

13. The computer-implemented method of claim 10, wherein the physical key is configured to perform at least one of unlock at least one door of the vehicle, lock the at least one door of the vehicle, start an engine located on board the vehicle, stop operation of the engine located on board the vehicle, open a tailgate to access a trunk of the vehicle, or close a trunk tailgate of the vehicle.

14. The computer-implemented method of claim 10, further comprising:
generating, by the processor, a confirmation of access request granted;
forwarding, by the processor, the confirmation to the second device; and
forwarding, by the processor, notification of the confirmation to the first device.

15. The computer-implemented method of claim 13, further comprising:
in response to the determination that the first cryptographic signature and the second cryptographic signature are verified, granting, by the processor, the second device access to the key interface to enable remote interaction with the physical key.

16. The computer-implemented method of claim 15, further comprising:
in response to a determination that the first cryptographic signature does not correspond to the second cryptographic signature, denying, by the processor, access of the second device to the key interface.

17. A computer program product stored on a non-transitory computer-readable medium and comprising machine-executable instructions, wherein, in response to being executed, the machine-executable instructions cause a processor of a key interface installed in a vehicle to perform operations, comprising:
receiving a first cryptographic signature from a first device associated with an owner of the vehicle, wherein the key interface is configured to interact with a physical key that comprises an embedded radio frequency identification device (RFID) that enables control of controls a set of operations of the vehicle, wherein the physical key is physically locked in the key interface, and wherein the key interface comprises a faraday cage generator;
establishing, via the faraday cage generator, a faraday cage around the physical key that blocks transmissions from the embedded RFID to disable control of the set of operations of the vehicle;
receiving an access request from a second device associated with an entity requesting access to the key interface, wherein the access request includes a second cryptographic signature;
determining whether the first cryptographic signature and the second cryptographic signature are verified; and
in response to a determination that the first cryptographic signature and the second cryptographic signature are verified, removing, via the faraday cage generator, the faraday cage around the physical key to enable transmissions from the embedded RFID to enable control of the set of operations of the vehicle.

18. The computer program product according to claim 17, wherein at least one of the first cryptographic signature is received from the first device via short range wireless communication technology, or the access request is received from the second device via short range wireless communication technology.

19. The computer program product according to claim 17, wherein the second cryptographic signature, received from the second device, is generated by the first device as a copy of the first cryptographic signature.

20. The computer program product according to claim 17, wherein the physical key is configured to perform at least one of unlock at least one door of the vehicle, lock the at least one door of the vehicle, start an engine located on board the vehicle, stop operation of the engine located on board the vehicle, open a tailgate to access a trunk of the vehicle, or close a trunk tailgate of the vehicle, and wherein the operations further comprise:
in response to the determination that the first cryptographic signature and the second cryptographic signature are verified, granting, by the processor, the second device access to the key interface to enable remote interaction with the physical key.

* * * * *